United States Patent Office 3,578,645
Patented May 11, 1971

3,578,645
LACTONE POLYMERS AND PROCESS
OF PREPARING
William Lee Hergenrother, Akron, Ohio, assignor to The
Firestone Tire & Rubber Company, Akron, Ohio
No Drawing. Filed Sept. 25, 1969, Ser. No. 861,190
Int. Cl. C08f 15/28
U.S. Cl. 260—78.5                 12 Claims

ABSTRACT OF THE DISCLOSURE

This invention relates to polymers produced from vinyl halide or vinylidene halide by reaction with a dialkyl maleate or fumarate, with pyrolysis of the polymer to form gamma lactone groups in the polymer chain. The invention includes the product and the process.

---

This invention relates to polymers containing lactone groups produced by pyrolysis of a polymer obtained by the reaction of a vinyl halide or vinylidene halide or both, with a dialkyl maleate or fumarate or a mixture of the two.

An article by Zutty and Welch in Journal of Polymer Science, part A, vol. 1, pages 2289–2297 (1963) describes various reactions of vinyl chloride and methyl methacrylate, and explains that in order to obtain lactonization it is necessary to have alpha substitution in the ester comonomer, as is the case with methyl methacrylate. The article explains that ester comonomers containing no alpha substitution form little, if any, lactone upon pyrolysis.

It has now been found that with a polymer formed from a diester, such as a dialkyl fumarate or maleate, it is not necessary to have alpha substitution in order to produce a lactone. In the esters of such dicarboxylic acids, one of the acid groups forms the lactone, while the other is non-reactive.

In a commercial operation the vinyl or vinylidene halide will be vinyl chloride or vinylidene chloride, and these will be referred to herein without limiting the scope of the reaction thereto, but merely as illustrative, as the other halides may be employed, such as vinyl bromide, etc.

The ester is a dialkyl ester, and in the pyrolysis one of the ester groups reacts with the chlorine or other halide of the vinyl or vinylidene compound. In order to remove the alkyl halide that is formed, the ester groups should be such that the halide volatilizes at the polymerization temperature. Thus each ester group will normally contain 1 to 7 or 8 carbon atoms, depending upon which halide is employed.

The lactone product is valuable as a resin and is flame resistant due to the presence of the halogen, and if vinylidene chloride is used in the reaction flame resistance is increased because the halogen content of the resin is increased. The polymers derived from vinylidene chloride are much stiffer resins than those derived from vinyl chloride and vinylidene chloride is valuable as a replacement of vinyl chloride where a stiffer or more fire-resistant end product is desired.

The alkyl halide which is volatilized as a by-product of the reaction may be used as a foaming agent, if a foam is desired. (Anspon and Pschorr U.S. 2,684,341 discloses the production of foams from a reaction in which alkyl halides are released.)

The lactone is produced from a copolymer of the vinyl or vinylidene compound and the ester. The production of such copolymers is well known in the art. By using lauroyl peroxide as a catalyst of the copolymerization and a temperature of 40° to 50° C. for example, a copolymer of substantially uniform composition throughout its length and relatively free of block polymer is obtained, and this is desirable because the lactone is produced from adjacent diester and chloride units. The pyrolysis which converts the copolymer to the lactone is carried out at a temperature of at least about 150° C., and it may be as high as 250° C. or higher, and preferably within the range of 185° to 220° C.

The following equation in which R is any suitable alkyl group, illustrates a section of a polymer chain with adjacent ester and vinyl units, and the release of alkyl chloride on pyrolysis to produce the lactone:

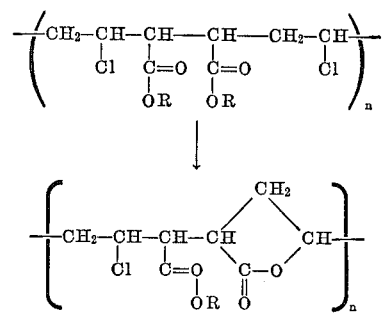

If vinylidene chloride is employed in the reaction, the starting polymer will include geminal-dichloro groups in the starting chain, instead of monochloro groups as shown, and after pyrolysis one of the geminal groups will remain, and there will be a single chlorine on the gamma-carbon of the lactone ring.

The fact that the gamma lactone reaction takes place instead of the beta reaction has been proven by IR (infrared) examination of different reaction products.

The invention is further illustrated by the following examples:

EXAMPLE 1

Four 12-ounce polymerization bottles were each charged with 25.8 grams (0.15 mol) of diethyl maleate and 0.67 gram of lauroyl peroxide (1% by weight). After purging with nitrogen, 49.1 grams (0.67 mol) of vinyl chloride was added as a liquid. Then vinyl chloride was allowed to boil off until the foregoing amount remained. Thus the reactants used in producing the copolymer were in an azeotropic composition having the copolymerization ratios of .77 for vinyl chloride and .009 for the diethyl maleate. This gave a copolymer with a substantially uniform composition throughout its length of approximately 62 percent vinyl chloride.

To produce the copolymer, the bottles were sealed and placed in stainless steel bottle guards, and after standing for one hour to warm to room temperature they were placed in a 40° C. rotating polymerizer. After 24 hours the bottles were transferred to a 50° C. polymerizer for an additional 24 hours. The bottles were then vented and 100 cc. of chloroform was added and they were placed in a 40° C. polymerizer for three days until all of the polymer had dissolved. The polymer was then precipitated by methanol in a Waring Blendor, washed and dried at 60° C. in a forced-air oven. A total of 224 grams (83%) of vinyl chloride-diethyl maleate copolymer was obtained from the four bottles. The intrinsic viscosity was measured in a mixture of 1:1 phenol tetrachloroethane at 25° C. and was 0.52.

Five grams of the vinyl chloride-diethyl maleate copolymer in this manner was added to a sidearm test tube equipped with a stirrer. Then 0.1 gram of dibutyl tin dilauryl-mercaptide (Thermalite 20) was added to stabilize the vinyl chloride to prevent release of hydrogen chloride which would cross link the copolymer. (Stabilizers for vinyl chloride and vinylidene chloride are well known, and any suitable one may be used. They include, for example, alkali or alkaline earth oxides as well as organic products including amines, alkyl and aryl metallic compounds, sulfur-containing tin compounds, metal soaps and esters of tin, barium and cadmium compounds.) The test tube was purged with nitrogen for 10 minutes and then heated to 185° C. in a metal bath with stirring, while the pressure was gradually reduced. The reaction was continued for two hours at 185° C. under a pressure of 0.5 to 1.0 millimeter of mercury. The melt was stirred occasionally during this time to prevent foaming due to the release of ethyl chloride, and to insure good heat transfer. Upon cooling, a yellow polymer was obtained that was completely soluble in chloroform. The intrinsic viscosity of this lactone-containing polymer measured as above was 0.66. The lactone present was substantiated by infra-red measurement of the ratio of the optical density of the gamma lactone band to the optical density of the ester band, and was 0.65. This infra-red ratio in the starting polymer was 0.01. There was no evidence of the presence of a beta lactone in the product.

The maleate ratio of 0.009 indicates little possibility of forming maleate-maleate bonds in the copolymer. For all practical purposes the ratio of vinyl units to adjacent maleate units in the copolymer of substantially uniform composition throughout its length is at least 10 percent and may be over 90 percent.

EXAMPLE 2

A copolymer of vinyl chloride and butyl fumarate (25:75) was prepared in a manner similar to that used in preparing the copolymer of Example 1.

A sample of this copolymer of substantially uniform composition was pyrolyzed in an electrically heated press between aluminum foil, and the growth of the gamma lactone band was followed as given in the time-temperature table below.

| | Temperature (° C.) | O.D.[1] Gamma Lactone/O.D.[1] Ester |
|---|---|---|
| Time (minutes): | | .023 |
| 15 | 185 | .21 |
| 7 | 200 | .40 |
| 24 | 200 | .58 |
| 35 | 220 | .56 |

[1] O.D.=Optical density.

There was no evidence of beta lactone being present.

In commercial operations, the ratio of the two comonomers used in producing the copolymer may be controlled by using continuous copolymerization in which the monomers are added to the polymer reactor continuously at a desired ratio to minimize the formation of block polymer. However, complete freedom from block polymer is not necessary, and an excess of the vinyl chloride will produce an excess of vinyl chloride units. However, maximum uniformity in the polymer chain is necessary for maximum lactone production. Even with maximum uniformity, the infra-red optical density ratio of gamma lactone to ester, as described in the above examples, should never exceed a value of 1.0 because the formation of a lactone only utilizes one of the ester groups present in the comonomer. It may be much less because of incomplete reaction or because of formation of block polymer, and may vary over the total range from 0 to 1.

Thus, the polymer is characterized in the infra-red by a ratio of the optical density (O.D.) of the gamma lactone to the remaining ester of from 0 to 1.

I claim:

1. The method of producing a gamma lactone from a copolymer of (1) a dialkyl ester of the class consisting of maleates and fumarates in which the alkyl groups comprise 1 to substantially 8 carbon atoms and (2) a vinyl compound of the class consisting of vinyl halides and vinylidene halides, in which copolymer at least 10 percent of the vinyl units are adjacent to ester units, which method comprises pyrolyzing the copolymer in the presence of a stabilizer for the vinyl halide produced, at a temperature in the range of substantially 150° C. to 250° C. at which there is substantial separation of alkyl halide.

2. The method of claim 1 in which the copolymer is derived from a maleate.

3. The method of claim 1 in which the copolymer is derived from a fumarate.

4. The method of claim 1 in which the copolymer is derived from vinyl chloride.

5. The method of claim 1 in which the copolymer is derived from vinyl chloride and a maleate.

6. The method of claim 1 in which at least 90 percent of the vinyl units are adjacent to ester units.

7. The method of claim 1 in which the pyrolyzation is carried out in the range of 185° C. to 220° C.

8. A polymer containing gamma lactone groups in the backbone of the polymer, which polymer comprises an alkyl-ester group adjacent each lactone group, the alkyl radical comprising 1 to substantially 8 carbon atoms.

9. The polymer of claim 8 which consists substantially entirely of lactone and adjacent ester groups.

10. The polymer of claim 8 in which there are monohalogen-containing units adjacent the ester-containing units.

11. The polymer of claim 8 in which there are geminal halogen-substituted units adjacent the ester units and the lactone units are gamma halogenated.

12. A process of producing a gamma lactone-containing polymer from a copolymer which comprises (1) alkyl maleate or fumarate units in which each alkyl group comprises 1 to substantially 8 carbon atoms and (2) vinyl halide or vinyldene halide units, preferably vinyl chloride or vinylidene chloride, which process comprises pyrolyzing such a copolymer in which there are such units adjacent one another.

References Cited

UNITED STATES PATENTS 3,224,982  12/1965  Zutty et al. _____ 260—2.5
3,299,012  1/1967  Kern _____ 260—78.5

JOSEPH L. SCHOFER, Primary Examiner

J. KIGHT III, Assistant Examiner

U.S. Cl. X.R.

260—2.5, 78.3